Aug. 13, 1940.                    H. G. ZOIA                    2,211,486
                              COFFEEPOT OR THE LIKE
                              Filed June 12, 1939

INVENTOR.
HECTOR G. ZOIA
BY Milburn & Milburn ATTORNEYS.

Patented Aug. 13, 1940

2,211,486

UNITED STATES PATENT OFFICE 2,211,486

COFFEEPOT OR THE LIKE

Hector G. Zoia, Cleveland, Ohio

Application June 12, 1939, Serial No. 278,624

6 Claims. (Cl. 53—3)

This invention relates to the art of coffeepots, teapots and the like.

The general type of device, upon which the present invention is an improvement, is illustrated in the patent to Cassol, No. 2,053,021, September 1, 1936. As in this patented device just referred to, so also in the present improved form of device, it is contemplated that the ground coffee, the tea leaves or the like will be confined beneath the perforated plunger filter which will occupy lowered position within the container, and that the essence of the tea or coffee will seep up through the filter and thus flavor the hot water which will fill the container to the proper height according to the quantity of tea, coffee or other ingredient which is placed in the container. After standing for the proper length of time and without any other attention, the tea or coffee may be poured from the container in a clear condition since the tea leaves or coffee grounds are confined entirely to the space below the plunger filter. Accordingly, the plunger filter must engage the wall of the container in such manner that the coffee grounds or tea leaves can not pass by the same.

Now therefore, the object of my present invention is to provide such a device of comparatively simple structure, involving correspondingly reduced labor in its manufacture and assembly and at the same time affording the requisite efficiency for practical success.

More specifically, the improvement in my present invention resides in the comparatively simple and yet efficient means for providing effective engagement between the plunger filter and the wall of the container.

Other objects will appear from the following description and claims when considered together with the accompanying drawing.

It is to be understood that the present forms of disclosure are merely for the purpose of illustration and that there may be devised various other modifications without departing from the spirit of my invention as herein set forth and claimed.

Referring now to the accompanying drawing in detail, the cup-shaped container 1 is adapted to receive the plunger filter which has effective, snug, resilient engagement with the wall of the container and which is raised and lowered by means of the stem 2 extending out through the removable top 3 of the container.

Figure 1:
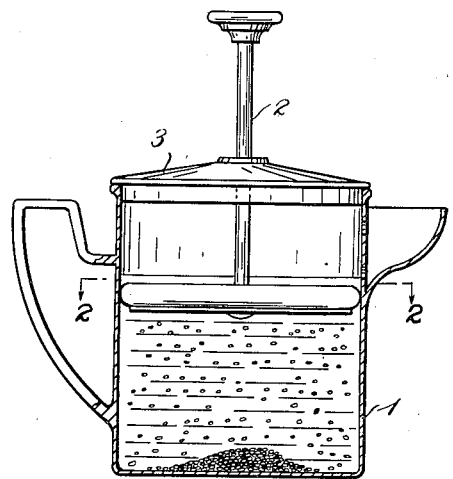
Fig. 1 is a vertical sectional view of my present device in one of its forms.
Figure 2:
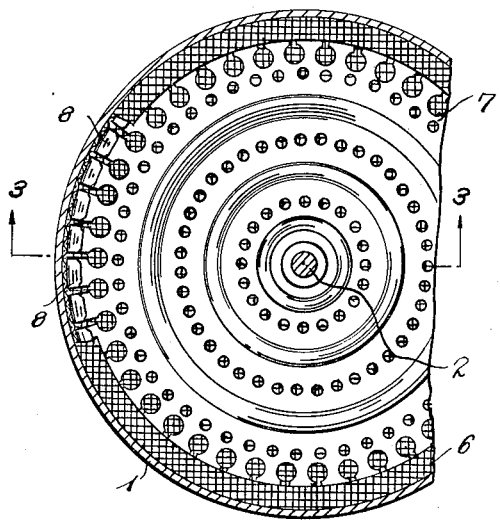
Fig. 2 is a view taken on line 2—2 of Fig. 1.
Figure 3:
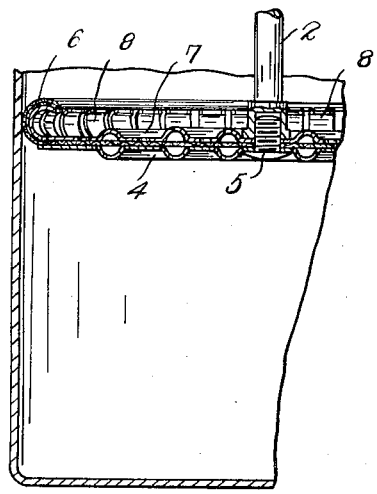
Fig. 3 is a view taken on line 3—3 of Fig. 2.

In the form of device as illustrated in Figs. 1, 2 and 3, the plunger filter comprises the lower positioned perforated substantially rigid metal disk 4 which has a screw threaded member 5 affixed to the centre thereof for attachment of nut member on the stem 2. As indicated, the disk 4 stops short of the wall of the container. The filter disk of fine metal mesh 6 extends over the top of disk 4 and is held in place thereupon by the upper perforated metal disk 7, the perforations of which will register with or otherwise have communication through those of the lower circumferentially grooved disk 4.

As herein indicated, the marginal portion of the metal mesh 6 is curled back upon itself and has snug engagement with the wall of the container 1. The resilient engagement of the metal mesh 6 with the container wall is augmented by the provision of the integrally formed radially resilient fingers 8 upon the marginal portion of the metal disk 7 which is chosen of such material that these fingers will possess the required resilience for this purpose. In the form of structure as herein illustrated, these fingers are made narrow at their base portions and they are provided about the entire circumference of the disk 7. The particular number, form and dimensions of these fingers may vary so long as they provide the required radially resilient engagement herein contemplated. For instance, there might be provided only a comparatively few such fingers spaced equi-distant about the periphery of the disk 7.

Figure 4:
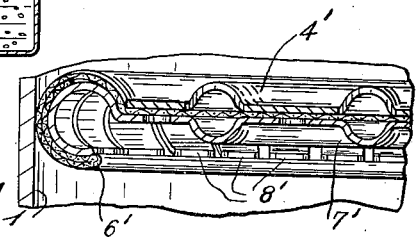
Fig. 4 is a partial, enlarged view illustrating a variation of my present invention.

By having the individual fingers of resilient metal, there will be produced increased engagement of the filter metal mesh with the container wall at individual portions thereof, thereby augmenting the resilient engagement of the filter metal mesh therewith for the purpose intended. Thus, by having the curled portion of the metal mesh held at all times and at all points of the container wall in effective engagement therewith, it is ensured that the filtering action will be complete throughout the entire cross-sectional area of the interior of the container. Also, the curl of these fingers is of such extent that their free ends are somewhat over-hanging, as herein indicated, so as to always maintain their proper engagement with the wall of the container, even during quick upward movement of the plunger, and the edge portion of the wire mesh is also curled in somewhat the same manner and for the same purpose, as is more clearly illustrated in the enlarged illustration of Fig. 4.

By employing the spring fingers 8, it is possible to employ a grade of metal mesh or other form of filter medium which does not itself possess the resilience above referred to; in which event, the requisite radial resilience may be provided largely if not solely by the spring fingers 8.

If so desired, the arrangement of the parts of the plunger filter may be reversed by curling the edge portion of the metal mesh and the spring fingers downwardly, as will be understood. In such arrangement, the disk 7' will be so formed that the main body thereof occupies a plane through approximately the diameter of the curled fingers, as indicated in Fig. 5, this for the purpose of ensuring most efficient radial action of the spring fingers during upward movement of the plunger.

Figure 5:
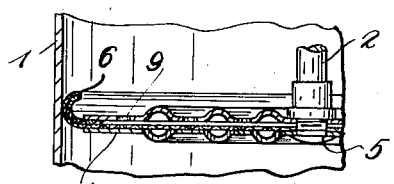
Fig. 5 is a partial view illustrating another variation thereof.

By selecting the metal mesh of certain character, it alone will be sufficient to afford the requisite resilience for effective engagement with the inner wall of the container, even in case of an imperfectly formed cylindrical surface, this modification being illustrated in Fig. 5 of the drawing. Thus the spring fingers 8 may be omitted but there will be provided a means for reinforcing the central portion of the metal mesh, as indicated by reference numeral 9, and there is obtained a radially active resiliency which is effective for the purpose intended, especially when the marginal portions of the metal mesh is folded upon itself, as indicated in Fig. 5 and more clearly in Fig. 4, although these two figures illustrate otherwise different specific forms of my device.

In the use of this device, the ground coffee is placed in the container 1 and the plunger filter is then placed in the lower part thereof so as to cover the same. Boiling water is placed in the container to the proper height according to the quantity of coffee being used; and after permitting the same to stand for the requisite length of time, the coffee may be poured from the container without any of the coffee grounds which are still confined entirely below the plunger filter. As will be understood, the flavor and essence of the coffee in the bottom of the container will seep up through the filter and be dissolved in the water. The plunger may be removed whenever desired for the purpose of cleaning the device and placing fresh coffee or the like therein, such manipulation of the plunger filter being accomplished without any difficulty whatever.

Thus I have devised a comparatively simple construction in which the plunger filter, in any of the several variations herein shown, will conform itself automatically to the irregularities of the inner surface of the container wall at any and all portions thereof, either with or without the auxiliary spring fingers on the metal disk 7; and this device can be manufactured and sold at a comparatively low price.

It is to be understood that the container may be made of any suitable material, and the means for reinforcing the central portion of the filter disk of metal mesh may be given various forms, either when the spring fingers are included or not, it being understood that the substantially rigid metal disks 4 and 6 do serve to hold the metal mesh filter member in proper position and to reinforce the same. Also, if the flexibility of the disk 7 so requires, another substantially rigid perforated disk may be added so as to render the central portion thereof sufficiently rigid but without interfering with the resilient action of the spring fingers 8. In such case, the member 7 may be in the form of a ring; that is, the central portion thereof may be omitted.

Also, this device may be employed in connection with various ingredients and is not to be understood as being limited to the making of tea or coffee.

What I claim is:

1. In a coffeepot or the like, the combination of a cup-shaped container, a perforated sheet metal plunger reciprocatable therein, a filtering medium extending across said plunger and engaging the wall of said container, and a plurality of radially extending resilient sheet metal fingers formed integrally with the periphery of said plunger and curled in a vertical plane and individually engaging the edge portion of said filtering medium for ensuring effective engagement thereof with the wall of the container.

2. In a coffeepot or the like, the combination of a cup-shaped container, a perforated plunger reciprocatable therein, a filtering medium extending across said plunger and engaging the wall of said container, and a plurality of radially extending resilient sheet metal fingers attached to the periphery of said plunger as a unitary part thereof and curled in a vertical plane and having free end portions individually engaging the edge portion of said filtering medium for ensuring effective engagement thereof with the wall of the container.

3. In a coffeepot or the like, the combination of a cup-shaped container, a perforated sheet metal plunger reciprocatable therein, a filtering medium of resilient fine metal mesh extending across said plunger and having its edge portion curled vertically for radially resilient engagement with the wall of the container, and a plurality of resilient slitted metal fingers extending radially from said plunger as an integral part thereof and curled in a vertical plane and having free end portions engaging the curled edge portion of said metal mesh for further ensuring effective engagement of the filter metal mesh with the wall of the container.

4. In a coffeepot or the like, the combination of a cup-shaped container, and a plunger filter reciprocatable therein, said plunger filter including a disk of resilient fine metal mesh having its edge portion curled vertically so as to provide a radially resilient free edge portion for effective engagement with the wall of the container, and said plunger filter having a single, one-piece means for reinforcing the central part thereof and for also augmenting the radially resilient engagement throughout the marginal part thereof.

5. In a coffeepot or the like, the combination of a cup-shaped container, a perforated sheet metal plunger reciprocatable therein, a filtering medium extending across said plunger and engaging the wall of said container, and a plurality of radially extending overhanging resilient slitted sheet metal fingers formed as a unitary part of the periphery of said plunger and curled in a vertical plane and having free end portions individually engaging the edge portion of said filtering medium for ensuring effective engagement thereof with the wall of the container.

6. In a coffeepot or the like, the combination of a cup-shaped container, a perforated plunger reciprocatable therein, a filtering medium extending across said plunger and engaging the wall of the container, and a plurality of radially extending resilient fingers attached to the periphery of said plunger and curled downwardly, with their free end portions individually engaging the edge portion of said filtering medium for ensuring effective engagement thereof with the wall of the container, and with the body of the disk occupying a plane corresponding approximately with the diameter of the curled fingers.

HECTOR G. ZOIA.